Feb. 25, 1964 G. L. HARRELL Re. 25,525

CASKET HARDWARE

Original Filed April 6, 1960

INVENTOR.
George L. Harrell,
BY Parker & Carter
Attorneys.

United States Patent Office

Re. 25,525
Reissued Feb. 25, 1964

25,525
CASKET HARDWARE

George L. Harrell, Elmwood Park, Ill., assignor to The Merit Company, Chicago, Ill., a corporation of Illinois Original No. 3,025,624, dated Mar. 20, 1962, Ser. No. 20,337, Apr. 6, 1960. Application for reissue Apr. 24, 1963, Ser. No. 276,130
3 Claims. (Cl. 161—8)

Matter enclosed in heavy brackets [ ] appears in the original patent but forms no part of this reissue specification; matter printed in italics indicates the additions made by reissue.

This invention is in the field of caskets and is concerned with decorative hardware.

A primary object of my invention is a casket with removable corner insert ornaments.

Another object is a cut corner casket with decorative ornaments socketed into the corners.

Another object is a removable ornament or hardware which is simple to remove and change.

Other objects will appear from time to time in the ensuing specification and drawings in which.

Figure 1:
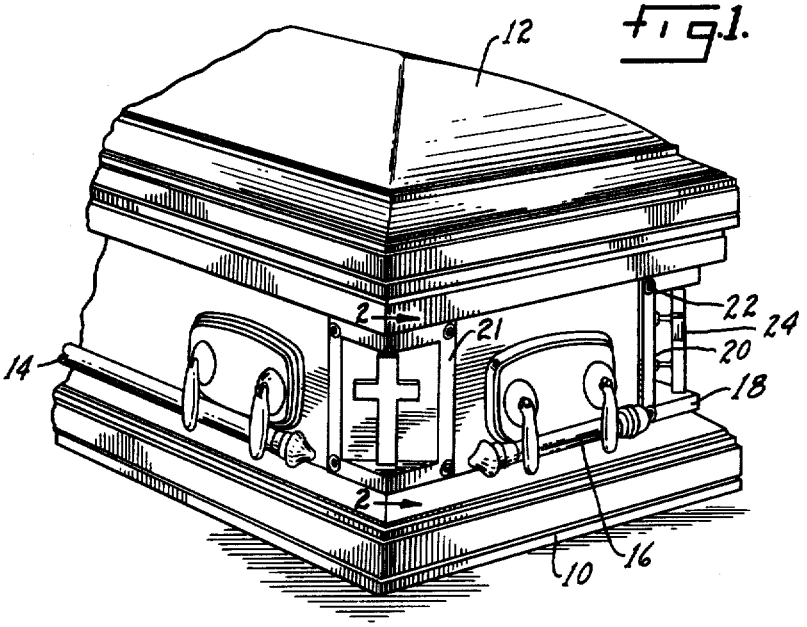
FIGURE 1 is a perspective view of a casket embodying my invention.
Figure 2:
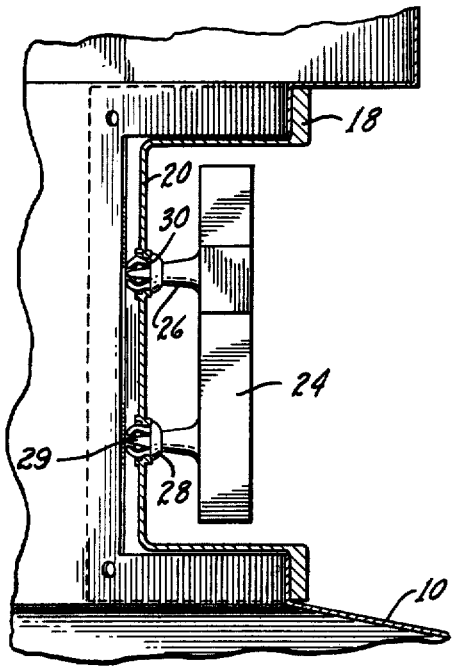
FIGURE 2 is a section along line 2—2 of FIGURE 1.

In FIGURE 1, I have shown the casket as including a body portion 10 which is elongated in the usual manner and has an open top closed by a pivoted lid 12 or the like. The lid may be split to form a half couch or it may be one piece. I provide the usual handles along the side at 14 and across the ends at 16.

At the corner, I cut or indent and connect a mounting or frame 18 which might be of cast metal construction, for example. The frame may be formed on an angle to fit both the side and the end of the casket and has a rear surface 20 extending at approximately 45 degrees to the side and end. A rim 21 surrounds the frame 18 and is adapted to lie flat against corresponding portions of the side and end of the casket. The rim may be held by suitable screws or fasteners at the corners as at 22, if desired.

I position an insert in the frame, as at 24, which may be in the form of a religious or fraternal symbol, for example a cross, as shown, or the Star of David. In any event, the symbol has plugs or legs 26 on its rear surface with a spring type bulb 28, comprising a cluster of curved spring members 29, on the end of each which fits in sockets 30 formed on the back surface 20 of the frame. While I have shown two sockets and plugs, it might be done with more or less. Also, the sockets might be in the back of the symbol or ornament, rather than in the frame, just the reverse.

The use, operation and function of my invention are as follows:

I provide cut or socketed corners on a conventional casket. I use the corners since the sides and ends normally have handles. The corners also normaly have fixed or permanent hardware.

In the sockets I have removable inserts which may take the form of religious or fraternal symbols. The inserts may be pressed in manually and easily removed and, when mounted, they appear as a permanent part of the casket.

A funeral director is required to stock a large number of different caskets, and the decorative hardware which appeals to his customers must vary to suit a number of tastes. With my invention, the funeral director can keep a limited number of basic styles of caskets. And the hardware at the corners can be quickly and easily changed to suit the taste of his customer. For example, assuming that the cross is chosen, four crosses can be socketed into the corners and will appear as a permanent part of the unit. The funeral director's problem is greatly simplified since he can have a minimum number of casket styles and any given number of inserts.

I position the inserts in the cut corners or sockets so that the hardware takes on a raised or projected and distinctive appearance. The back or cross surface of the frame at the corners may also be decorative to outline or emphasize the insert chosen. I find it particularly advantageous to have the insert somewhat sunk into the corner to get it out of the way, but at the same time it is fully visible. I have shown the corners cut at 45° but it should be understood that it might be otherwise. It might be somewhat convex or concave or at a different angle and straight. But I do prefer that the insert be set in or countersunk and not projecting perceptibly beyond the normal confines of the casket.

While I have shown and described the removable ornaments as being mounted at the corners, it should be understood that it might be otherwise. Also, the ornaments do not necessarily have to be fully countersunk or recessed. Also, while the socket arrangement for attaching the ornaments as shown is preferred, in certain situations I might use other connections, for example, magnets. Additionally, I have shown the connections on the back of the ornaments, but it should be understood that the connection might be made at the bottom so that the ornament would socket or connect, for example, on the bottom triangular surface of the frame or background. Or it might be on top. This would have the advantage that no plugs or legs would show. In such a situation, the ornament would preferably be spaced somewhat from the back or rear surface of the frame. Also, the frame itself might be removable as a unit with the ornament. But I prefer that the ornament be removably connected or socketed into the frame, be it at the corners of the casket or otherwise.

While I have shown and described the preferred form of my invention, it should be understood that numerous additional modifications, changes, substitutions and alterations may be made without departing from the invention's fundamental theme. I, therefore, wish that the invention be unrestricted, except as by the appended claims.

I claim:

[1. For use in a casket, ornamental hardware adapted to be mounted in a generally upright position in indents on the corners thereof, including a frame having a generally rectangular exterior with a rear wall to be disposed at approximately 45° across and closing the indent when the frame is mounted therein, the sides of the frame being generally straight with the top and bottom projecting and converging forward from the rear wall generally parallel to the sides and ends of the casket and intersecting a distance outwardly from the rear wall thereby defining a cut corner, and an insert ornament removably mounted in the cut corner normal to the rear wall and generally within the confines of the sides and the top and bottom of the frame and generally symmetrically outlined thereby.]

DISCLAIMER 3,025,624.—*George L. Harrell*, Elmwood Park, Ill. CASKET HARDWARE. Patent dated Mar. 20, 1962. Disclaimer filed May 3, 1962, by the assignee, *The Merit Company*. Hereby enters this disclaimer to claim 1 of said patent. [*Official Gazette June 19, 1962.*]

[2. The structure of claim 1 further characterized by and including a connection between the insert ornament and the rear wall of the frame, the connection including at least two joints, one above the other, each joint including a spring bulb releasably fitting in an otherwise open socket.]

*3. For use on a casket, ornamental hardware adapted to be mounted in a generally upright position on the corners thereof, including*

*a frame having a generally rectangular exterior with a rear wall to be disposed at approximately 45° across the sides and ends of the casket when the frame is mounted thereon,*

*the sides of the frame being generally straight with the top and bottom projecting and converging forward from the rear wall generally parallel to the sides and ends of the casket and intersecting a distance outwardly from the rear wall thereby defining a cut corner,*

*an insert ornament removably mounted in the cut corner normal to the rear wall and generally within the confines of the sides and the top and bottom of the frame and generally symmetrically outlined thereby, and*

*a fastener assembly between the rear wall and the insert ornament, said fastener assembly including*

*first fastener structure carried by the insert ornament, and*

*second, cooperating, entirely exteriorly accessible fastener structure associated with the rear wall,*

*said first and second fastener structures being connectable entirely from the exterior of the casket, and when in engagement, maintaining the insert spaced from the rear wall.*

*4. The structure of claim 3 further characterized in that the fastener assembly between the insert ornament and the rear wall of the frame includes at least one leg supporting the insert ornament otherwise out of contact with the frame.*

*5. For use in a casket, ornamental hardware adapted to be mounted in a generally upright position in indents on the corners thereof, including a frame having a generally rectangular exterior with a rear wall to be disposed at approximately 45° across enclosing the indent when the frame is mounted therein, the sides of the frame being generally straight with the top and bottom projecting and converging forward from the rear wall generally parallel to the sides of the casket and intersecting a distance outwardly from the rear wall thereby defining a cut corner, an insert ornament, a connection between the insert ornament and the rear wall of the frame, the connection including at least two joints, one above the other, each joint including a spring bulb releasably fitting in an otherwise open socket, said ornament generally within the confines of the sides and the top and the bottom of the frame, and said ornament generally symmetrically outlined thereby.*

References Cited in the file of this patent or the original patent

UNITED STATES PATENTS

| | | |
|---|---|---|
| 331,981 | Lovett | Dec. 8, 1885 |
| 921,566 | Schlechter | May 11, 1909 |
| 1,755,157 | Anderson | Apr. 15, 1930 |
| 1,850,713 | Fox | Mar. 22, 1932 |
| 2,106,695 | Larson | Jan. 25, 1938 |
| 2,213,506 | Thorensen | Sept. 3, 1940 |
| 2,586,178 | Rochester | Feb. 19, 1952 |
| 2,712,191 | Hillenbrand | July 5, 1955 |
| 3,025,624 | Harrell | Mar. 30, 1962 |

FOREIGN PATENTS

| | | |
|---|---|---|
| 549,578 | Belgium | Aug. 14, 1956 |